No. 862,825. PATENTED AUG. 6, 1907.
F. HUFF.
PLOW.
APPLICATION FILED MAR. 26, 1907.

2 SHEETS—SHEET 1.

Witnesses

Inventor
F. Huff
By R. A. R. Lacey,
Attorneys

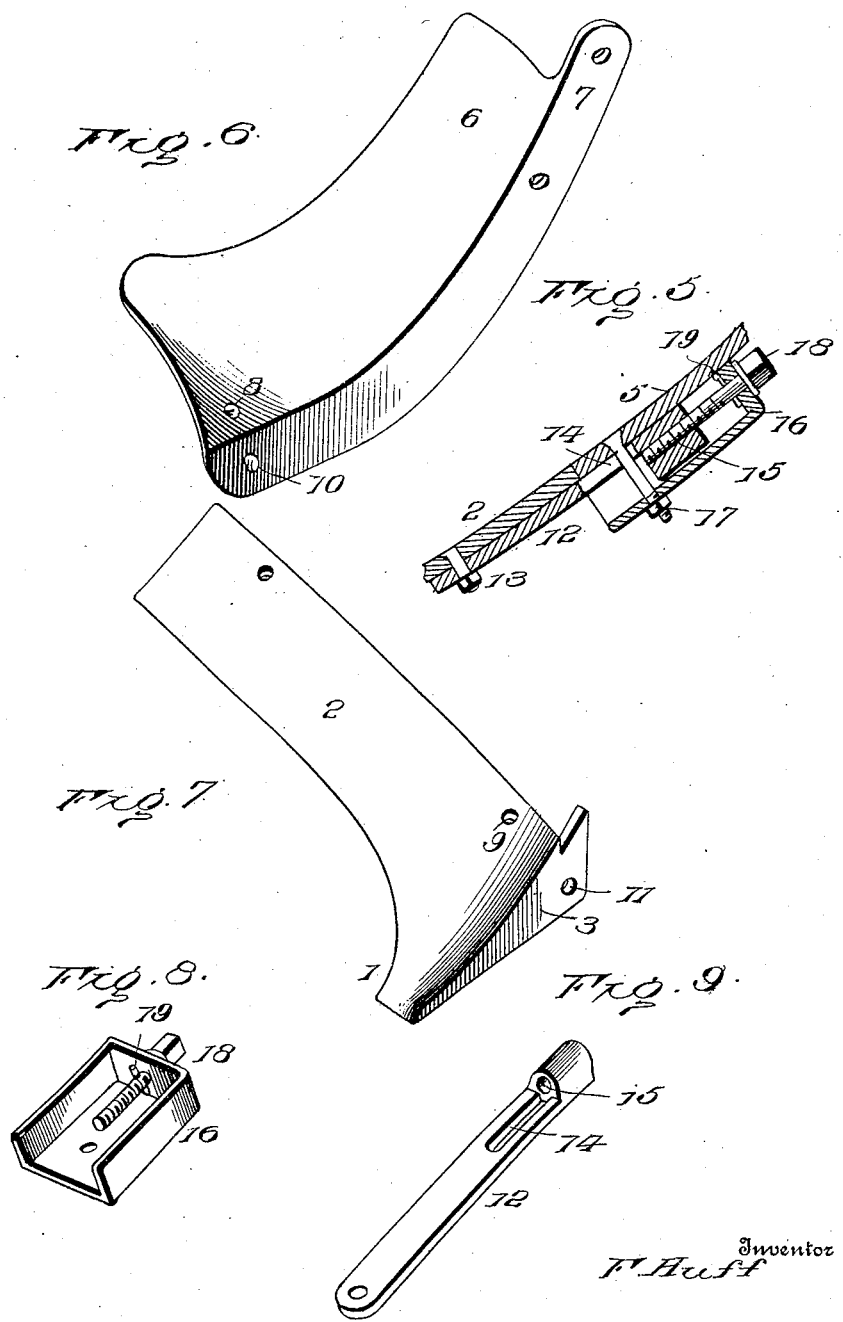

UNITED STATES PATENT OFFICE.

FURMAN HUFF, OF CALDWELL, KANSAS, ASSIGNOR OF ONE-HALF TO ROBERT JORDAN, OF CALDWELL, KANSAS.

PLOW.

No. 862,825.   Specification of Letters Patent.   Patented Aug. 6, 1907.

Application filed March 26, 1907. Serial No. 364,688.

*To all whom it may concern:*

Be it known that I, FURMAN HUFF, a citizen of the United States, residing at Caldwell, in the county of Sumner and State of Kansas, have invented certain new and useful Improvements in Plows, of which the following is a specification.

The purpose of this invention is to devise a novel construction and peculiar form of connection between the several parts of a plow, whereby a dull plow share may be detached and replaced either by a new or a sharp plow share without removing bolts or replacing the same, thereby saving time and labor.

For a full description of the invention and the merits thereof and also to acquire a knowledge of the details of construction and the means for effecting the result, reference is to be had to the following description and accompanying drawings.

Figure 1:
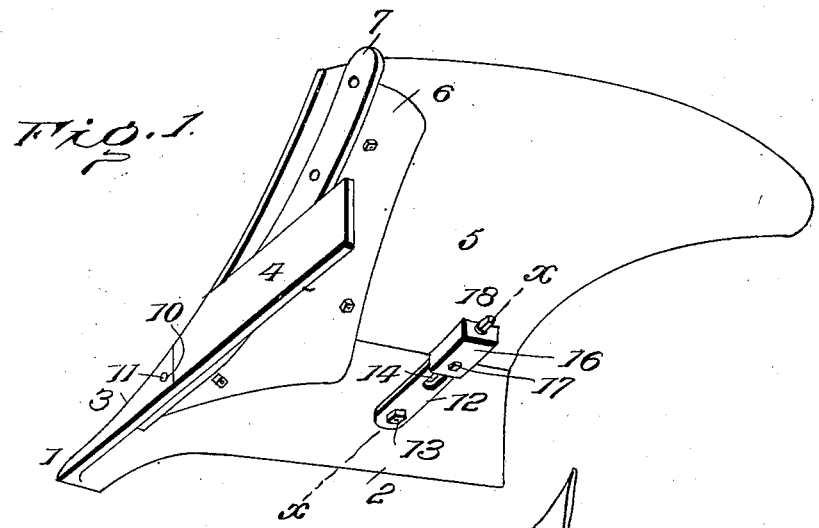
Figures 2, 3:
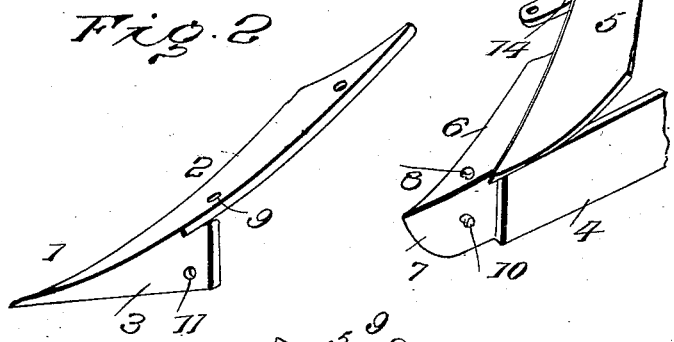
Figure 4:
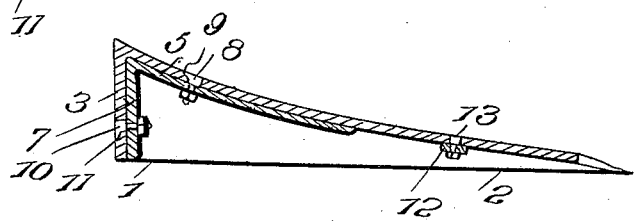

While the invention may be adapted to different forms and conditions by changes in the structure and minor details without departing from the spirit or essential features thereof, still the preferred embodiment is shown in the accompanying drawings, in which:

Figure 1 is a perspective view of a plow embodying the invention, showing the same inverted. Fig. 2 is a perspective view of the plow point and share. Fig. 3 is a perspective view of a portion of the mold-board and land-side showing the throat piece and coupling bar in place. Fig. 4 is a horizontal section. Fig. 5 is a section on the line x—x of Fig. 1. Fig. 6 is a detail perspective view of the throat piece. Fig. 7 is a perspective view of the plow point, share and front portion of the land-side. Fig. 8 is a perspective view of the box having the set screw attached. Fig. 9 is a perspective view of the coupling bar.

Corresponding and like parts are referred to in the following description and indicated in all the views of the drawings by the same reference characters.

The plow point 1, share 2 and front portion 3 of the land-side are of integral formation. The land-side 4 is adapted to abut against the rear end of the part 3 and is held in place by the throat piece. The mold-board 5 is of accustomed shape and construction and its lower edge abuts against the upper edge of the share 2. The throat piece comprises two wings 6 and 7 and is secured to the mold-board and land-side and projects a short distance beyond said parts as indicated most clearly in Fig. 3 to underlap the share 2 and overlap the front portion 3 of the land-side. A lug 8 projects from the upper side of the wing 6 and is adapted to enter an opening 9 near the lower end of the plow share 2. The lug 10 projects outward from the wing 7 and is adapted to enter an opening 10 near the rear end of the front part 3 of the land-side. These lugs 8 and 10 may be provided in the parts 6 and 7 of the throat piece in any manner preferably in a way to admit of their ready replacement in the event of rupture or otherwise being displaced or unfitted for effective service. A bar 12 is secured to the outer portion of the plow share by means of a fastening 13 and said bar projects rearward from the plow share and has a longitudinal slot 14 and a threaded opening 15, the latter being at the rear end of the bar and in line with the slot 14. A box 16 is secured to the outer lower portion of the mold-board upon the under side thereof and is adapted to receive the end portion of the bar 12 extended in the rear of the plow share 2. The pin constituting the fastening 17 connecting the box 16 to the mold-board passes through the slot 14 of the bar 12. The box 16 is closed at its rear end and at the bottom and sides, thereby protecting and housing the rear portion of the bar 12. A set screw 18 is passed through an opening in the rear end of the box 16 and its projecting end or head is made angular to receive a wrench or suitable tool. A key 19 passed through an opening of the set screw engages the inner side of the closed end of the box 16 and prevents outward displacement of said set screw, the shoulder at the inner end of the head engaging with the outer side of the closed end of the box and limiting the inward or forward movement of the set screw. The set screw 18 is adapted to enter the opening 15 and to make screw thread connection therewith with the result that the plow share is drawn close against the mold-board and retained in place.

The fastening 13 may be a lug similar to lugs 8 and 10 so as to make detachable connection with the plow share and thereby admit of the latter being removed without necessitating the removal of bolts, the plow share being rendered detachable upon loosening the set screw 19, whereby the several lugs or fastenings 8, 10 and 13 may relax their hold upon the plow share and admit of its ready displacement.

Having thus described the invention, what is claimed as new is:

1. The combination of a mold-board, a landside, a throat piece carried by the mold-board and landside, a share received by the throat piece and abutting against the mold-board, a box applied to one of the members, a bar applied to the opposite member and received within the box and having a pin and slot connection therewith, and a screw carried by the box and engaging the bar to draw the two members together.

2. The combination of a mold-board, a landside, a throat piece carried by the mold-board and landside, a share received by the throat piece and abutting against the mold-board, a box, a pin connecting the box to one of the members, a bar applied to the opposite member and received within the box, the said bar being formed with a slot through which the pin extends, and means coöperating with the bar for drawing the two members together.

3. The combination of a mold-board, a landside, a throat piece carried by the mold-board and landside, a share received by the throat piece and abutting against the mold-board, a box, a pin connecting the box to one of the members, a bar applied to the opposite member and received within the box, the said bar being formed with a slot through which the before mentioned pin extends, and a screw carried by the box and engaging the bar to draw the two members together.

4. The combination of a mold-board, a landside, a throat piece carried by the mold-board and landside, a share received by the throat piece and abutting against the mold-board, coöperating lugs and openings between the share and the throat piece, a box applied to one of the members, a bar carried by the opposite member and received within the box and having a pin and slot connection therewith, and a screw carried by the box and engaging the bar to draw the two members together.

In testimony whereof I affix my signature in presence of two witnesses.

FURMAN HUFF. [L. S.]

Witnesses:
C. C. RILLINGS,
E. E. MOREFIELD.